2,779,769
Patented Jan. 29, 1957

2,779,769

POLY-HALOGEN-CONTAINING DICARBOXYLIC ACIDS AND ANHYDRIDES

Paul Robitschek, Buffalo, Claude Thomas Bean, Jr., Niagara Falls, and Jack Samuel Newcomer, Wilson, N. Y., assignors to Hooker Electrochemical Company, Niagara Falls, N. Y., a corporation of New York No Drawing. Application September 10, 1952, Serial No. 308,924

8 Claims. (Cl. 260—346.6)

This invention relates to new halogen containing dicarboxylic acids, their anhydrides, and to methods for manufacturing the same, comprising the diene synthesis of hexachlorocyclopentadiene with α-substituted maleic acids or anhydrides.

It is known that hexachlorocyclopentadiene reacts with certain olefinic compounds having hydrogen atoms on the unsaturated carbon atoms; included among the known reactions is that of hexachlorocyclopentadiene with maleic anhydride. However, the art has taught no way that substituted maleic acids or anhydrides can be reacted with hexachlorocyclopentadiene to produce a chemical reaction adduct. It was, therefore, surprising and unexpected to find that 1,4,5,6,7,7-hexachloro-2-(substituted) bicyclo (2.2.1)-5-heptene-2,3-dicarboxylic acids or anhydrides may be made and recovered in good yield by reaction of hexachlorocyclopentadiene with the corresponding substituted acid or anhydride at elevated temperatures, presumably in accordance with the following equation:

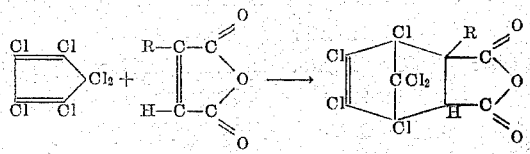

wherein R is the substituent.

In preparing the compounds of this invention, a solvent may be employed and, if used, it should preferably be inert with respect to the reactants and reaction products and should have a sufficiently high boiling point to allow for reaction at elevated temperatures without necessitating the application of superatmospheric pressure. The reaction temperatures employed are higher than 100 degrees centigrade and in order to obtain high yields, are preferably between about 150 and 250 degrees centigrade. The time allowed for reaction will vary with the purity of the reactants, the degree of completion of reaction desired, the solvents employed, et cetera. The reaction product resulting from the chemical addition reaction is preferably purified in order to obtain a colorless product. Ordinary purification procedures known in the art such as washing, adsorbent decolorization, recrystallization, et cetera, may be satisfactorily employed.

The following examples illustrate the compounds of this invention and methods for their preparation, however, they are not to be construed as limiting except as defined in the appended claims.

Example 1

A solution of 682 grams of hexachlorocyclopentadiene, 280 grams of citraconic anhydride and 100 milliliters of orthodichlorobenzene was refluxed at a temperature of about 188 degrees centigrade for a period of twenty-four hours. About 200 grams of crude product was recovered after removal of the solvent by steam distillation. The resulting solid, which was light brown in color, was washed with water, then given a Nuchar decolorization treatment after which it was crystallized three times from a mixture of normal hexane and carbon tetrachloride. The product recovered had a slight yellowish color and analyzed for 1,4,5,6,7,7-hexachloro-2-methyl bicyclo (2.2.1)-5-heptene-2,3-dicarboxylic anhydride as follows:

|   | Found | Theory |
|---|---|---|
| Percent Chlorine | 55.2 | 55.2 |
| Percent Hydrolyzable Chlorine | 47.2 and 45.0 |  |
| Melting Point, ° C.: |  |  |
| First Softening | 236.5 |  |
| First Melting | 237.5 |  |
| Last Crystal | 240.5 |  |
| Percent Acid | 0.9 |  |
| Percent Anhydride | 99.0 |  |
| Neutral Equivalent | 193 | 193 |

Hydrolyzable chlorine is determined by refluxing between 0.5 and three grams of the sample to be tested (depending on the chlorine content) for three hours in 50 milliliters of 95 percent ethanol containing seven grams of dissolved potassium hydroxide. Free chlorides developed are titrated and reported as percent hydrolyzable chlorine.

Neutral equivalent is determined by titrating the sample to be tested with aqueous sodium hydroxide to produce the sodium salt of the compound and is reported as the weight of sample which has an equivalent of acidity.

Example 2

Another sample of crude product prepared in a manner after Example 1 except that the reaction temperature was maintained at 166 degrees centigrade for a period of forty-eight hours, was finally recrystallized from acetic acid to give colorless crystals of 1,4,5,6,7,7-hexachloro-2-methyl bicyclo (2.2.1)-5-heptene-2,3-dicarboxylic anhydride having a melting point of 243.5 degrees centigrade.

Example 3

A solution of 545 grams of hexachlorocyclopentadiene and 264 grams of chloromaleic anhydride was heated and maintained at a temperature of about 178 to 180 degrees centigrade for about 89 hours. The reaction mixture was then subjected to a simple distillation and material boiling below a temperature of 156 degrees centigrade at seven milli-meters pressure was removed. The mixture remaining in the distillation vessel solidified on cooling to room temperature. The solid was recrystallized twice from normal hexane, exposed to the atmosphere, and 345 grams of a white solid was recovered which corresponds to a mixture of 1,4,5,6,7,7-hexachloro-2-chloro bicyclo (2.2.1)-5-heptene-2,3-dicarboxylic anhydride and acid, as follows:

|   | Found | Theory |
|---|---|---|
| Percent Chlorine | 60.2 | 61.2 (anhydride). 58.6 (acid). |
| Percent Hydrolyzable Chlorine | 14.9 |  |
| Melting Range, ° C. | 240 to 247 |  |
| Percent Acid | 38 |  |
| Percent Anhydride | 62 |  |
| Neutral Equivalent | 197 | 203 (anhydride). |

In a manner after the foregoing examples the following new compounds may be prepared: 1,4,5,6,7,7-hexachloro-2-bromo bicyclo (2.2.1)-5-heptene-2,3-dicarboxylic acid by the reaction of hexachlorocyclopentadiene with bromo-maleic acid. In like manner, 1,4,5,6,7,7-hexachloro-2-ethyl bicyclo (2.2.1)-5-heptene-2,3-dicarboxylic anhydride can be prepared by reacting hexachlorocyclopentadiene with ethyl maleic anhydride and this may be converted to the corresponding acid by heating in water.

The compounds of this invention are useful as chemical intermediates and in the manufacture of pharmaceuticals, plasticizers, insecticides, and in the preparation of resins.

The following example illustrates a typical use of a compound of this invention in making an infusible, insoluble polyester resin having many valuable and desirable characteristics.

Example 4

Sixteen and seven tenths parts of ethylene glycol and 28.6 parts of diethylene glycol were charged into a resin vessel, then blanketed with an inert nitrogen atmosphere, agitated, and heated to a temperature of about 100 degrees centigrade. To this agitated charge, was added 105.4 parts of 1,4,5,6,7,7-hexachloro-2-methyl bicyclo (2.2.1)-5-heptene-2,3-dicarboxylic anhydride, prepared in accordance with Example 1. Twenty-six and four tenths parts of maleic anhydride was then blended into the charged reactants. The reaction mixture was raised to a temperature of about 160 to 170 degrees centigrade, by the application of external heat and the water of esterifcation liberated was separated. When an acid number of approximately 77 was reached, the entire contents of the reaction vessel was then cast in pans under an inert nitrogen atmosphere. A transparent, substantially amber colored, hard, brittle, soluble resin, which melts in a temperature range between room temperature and below 100 degree centigrade and has a specific gravity at room temperature of about 1.44 was obtained.

One hundred and five parts of the cast product recovered was broken into small lumps and dissolved in 31.5 parts of styrene containing 0.031 part of hydroquinone. This mixture was copolymerized by the addition of 0.5 part of a polymerization catalyst made up of benzoyl peroxide and tricresyl phosphate. The resulting mixture was cast in a standard testing glass tube and cured at a temperature of about 50 degrees centigrade. A hard, tough, clear, amber colored, polyester resin having a chlorine content of 27 percent which is immediately self-extinguishing on removal from an oxidizing flame was obtained.

The other compounds of this invention are also useful as intermediates in the preparation of polyester resins similar to that given in the foregoing example. The invention is not to be construed as limited thereto as other uses are contemplated for the compounds of this invention.

We claim:

1. The process which comprises: reacting hexachlorocyclopentadiene with a member of the group consisting of chloro-maleic acid, bromo-maleic acid, chloro-maleic anhydride, bromo-maleic anhydride, their acid salts and mixtures thereof at a temperature between about 150 degrees and about 250 degrees centigrade.

2. The process for the preparation of 1,4,5,6,7,7-hexachloro-2-chloro bicyclo (2.2.1)-5-heptene-2,3-dicarboxylic anhydride which comprises: reacting hexachlorocyclopentadiene with chloro maleic anhydride at a temperature between about 150 and 250 degrees centigrade.

3. The process for the preparation of 1,4,5,6,7,7-hexachloro-2-bromo bicyclo (2.2.1)-5-heptene-2,3-dicarboxylic anhydride which comprises: reacting hexachlorocyclopentadiene with bromo maleic anhydride at a temperature between about 150 and 250 degrees centigrade.

4. A hexachlorocyclopentadiene adduct of the group consisting of chloromaleic acid, bromo-maleic acid, chloro-maleic anhydride, bromo-maleic anhydride, their acid salts and mixtures thereof.

5. The compound 1,4,5,6,7,7-hexachloro-2-chloro bicyclo (2.2.1)-5-heptene-2,3-dicarboxylic anhydride.

6. The compound 1,4,5,6,7,7-hexachloro-2-chloro bicyclo (2.2.1)-5-heptene-2,3-dicarboxylic acid.

7. The compound 1,4,5,6,7,7-hexachloro-2-bromo bicyclo-(2.2.1)-5-heptene-2,3-dicarboxylic anhydride.

8. The compound 1,4,5,6,7,7-hexachloro-2-bromobicyclo-(2.2.1)-5-heptene-2,3-dicarboxylic acid.

References Cited in the file of this patent

UNITED STATES PATENTS

| Number | Name | Date |
|---|---|---|
| 1,944,731 | Diels et al. | Jan. 23, 1934 |
| 2,391,226 | Clifford | Dec. 18, 1945 |
| 2,471,790 | Sowa | May 31, 1949 |
| 2,606,910 | Herzfeld et al. | Aug. 12, 1952 |

FOREIGN PATENTS

| 614,931 | Great Britain | Dec. 30, 1948 |
|---|---|---|

OTHER REFERENCES

Diels et al.: Annalen 460, p. 116 (1928).
Prill: JACS, vol. 69, pp. 62–3 (1947).